(12) United States Patent
Matsuda et al.

(10) Patent No.: US 9,517,678 B2
(45) Date of Patent: Dec. 13, 2016

(54) HIGH-VOLTAGE EQUIPMENT COOLING SYSTEM FOR ELECTRIC VEHICLE AND HIGH-VOLTAGE EQUIPMENT COOLING METHOD FOR ELECTRIC VEHICLE

(71) Applicant: HONDA MOTOR CO., LTD., Tokyo (JP)

(72) Inventors: Masanori Matsuda, Saitama (JP); Shinji Kakizaki, Saitama (JP); Takeshi Someya, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 568 days.

(21) Appl. No.: 13/786,315

(22) Filed: Mar. 5, 2013

(65) Prior Publication Data

US 2013/0237138 A1    Sep. 12, 2013

(30) Foreign Application Priority Data

Mar. 7, 2012    (JP) ................. 2012-050818

(51) Int. Cl.
*B60H 1/00* (2006.01)
(52) U.S. Cl.
CPC ...... *B60H 1/00457* (2013.01); *B60H 1/00278* (2013.01); *B60H 1/00392* (2013.01); *B60H 2001/003* (2013.01)
(58) Field of Classification Search
CPC ............... B60H 2001/00614; B60H 1/00457; B60H 1/00278; B60H 1/00392; B60H 2001/003
See application file for complete search history.

(56) References Cited

U.S. PATENT DOCUMENTS 5,309,731 A * 5/1994 Nonoyama ........ B60H 1/00849
62/244
5,432,026 A * 7/1995 Sahm ................. B60H 1/00278
429/120
(Continued)

FOREIGN PATENT DOCUMENTS

CN    1108186 A    9/1995
CN    102050009 A    5/2011
(Continued)

OTHER PUBLICATIONS

Weindorf, DE 10359064 B3 English machine translation, Mar. 10, 2005.*

(Continued)

*Primary Examiner* — Alissa Tompkins
*Assistant Examiner* — Phillip E Decker
(74) *Attorney, Agent, or Firm* — Westerman, Hattori, Daniels & Adrian, LLP (57) ABSTRACT

A high-voltage equipment cooling system for electric vehicle and a high-voltage equipment cooling method for electric vehicle are provided to improve the performance of an air-conditioning unit in the vehicle compartment, while cooling the high-voltage equipment. More specifically, the high-voltage equipment cooling system for electric vehicle includes a motor 103, a high-voltage equipment 101, a blowing means for high-voltage equipment 30, an outlet valve 50, an air conditioning means 10, and an air inlet mode selection means 20, wherein the air outside the vehicle compartment is introduced by the air inlet mode selection means 20 when supplying air cooled by an evaporator 14 in the air conditioning means 10 to the high-voltage equipment 101 using the blowing means for high-voltage equipment 30.

9 Claims, 4 Drawing Sheets

(56) References Cited

U.S. PATENT DOCUMENTS

| | | | | |
|---|---|---|---|---|
| 5,490,572 | A * | 2/1996 | Tajiri | B60H 1/00278 180/65.1 |
| 5,669,813 | A * | 9/1997 | Jairazbhoy | B60H 1/00271 361/645 |
| 5,706,170 | A * | 1/1998 | Glovatsky | B60R 16/0215 454/127 |
| 5,937,664 | A * | 8/1999 | Matsuno | B60H 1/00278 62/186 |
| 6,094,927 | A * | 8/2000 | Anazawa | B60H 1/00278 62/239 |
| 6,213,198 | B1 * | 4/2001 | Shikata | B60H 1/00478 454/161 |
| 6,315,069 | B1 * | 11/2001 | Suba | B60K 1/04 180/68.5 |
| 6,371,202 | B1 * | 4/2002 | Takano | B60H 1/00914 237/2 A |
| 7,819,172 | B2 * | 10/2010 | Otsuka | B60H 1/00428 165/80.3 |
| 8,991,477 | B2 * | 3/2015 | Katoh | B60H 1/00335 165/202 |
| 2006/0016588 | A1 * | 1/2006 | Haglsperger | B60H 1/00507 165/202 |
| 2006/0073378 | A1 * | 4/2006 | Hamery | B60L 11/1874 429/120 |
| 2007/0022772 | A1 * | 2/2007 | Zhu | B60H 1/00278 62/259.2 |
| 2007/0137235 | A1 * | 6/2007 | Heck | B60H 1/00271 62/259.2 |
| 2007/0204601 | A1 * | 9/2007 | Ishii | B60K 6/48 60/295 |
| 2008/0066476 | A1 * | 3/2008 | Zhu | B60H 1/00278 62/133 |
| 2008/0236181 | A1 * | 10/2008 | Zhu | B60H 1/00278 62/239 |
| 2009/0071178 | A1 | 3/2009 | Major et al. | |
| 2009/0088062 | A1 * | 4/2009 | Major | B60H 1/00278 454/70 |
| 2009/0095449 | A1 * | 4/2009 | Bandai | B60H 1/00278 165/104.33 |
| 2009/0176150 | A1 * | 7/2009 | Yanaka | B60H 1/00278 429/120 |
| 2009/0249803 | A1 * | 10/2009 | Suzuki | B60H 1/00278 62/56 |
| 2010/0089669 | A1 * | 4/2010 | Taguchi | B60H 1/00257 180/65.1 |
| 2010/0231035 | A1 * | 9/2010 | Tsuchiya | B60H 1/00278 307/9.1 |
| 2010/0301124 | A1 * | 12/2010 | Williams | B60H 1/0005 237/5 |
| 2011/0162901 | A1 * | 7/2011 | Lucas | B60H 1/00278 454/152 |
| 2011/0165830 | A1 * | 7/2011 | Smith | B60H 1/00278 454/140 |
| 2011/0171897 | A1 * | 7/2011 | Tsutsumi | B60H 1/00671 454/141 |
| 2012/0003910 | A1 * | 1/2012 | Richter | B60H 1/00278 454/141 |
| 2015/0266354 | A1 * | 9/2015 | Blackburn | B60H 1/00278 454/152 |
| 2015/0380785 | A1 * | 12/2015 | Takeuchi | B60H 1/00278 429/62 |

FOREIGN PATENT DOCUMENTS

| | | |
|---|---|---|
| DE | 10359064 B3 | 3/2005 |
| JP | 2001-291532 A | 10/2001 |
| JP | 2002-231321 A | 8/2002 |
| JP | 2004-001674 A | 1/2004 |
| JP | 2007-267494 A | 10/2007 |
| JP | 2008-126847 A | 6/2008 |
| JP | 2010-036723 A | 2/2010 |
| JP | 2010-231923 A | 10/2010 |
| JP | 2010-234934 A | 10/2010 |
| JP | 4631177 B2 | 2/2011 |
| JP | 2011-156982 A | 8/2011 |
| JP | 2012-012010 A | 1/2012 |

OTHER PUBLICATIONS

Japanese Office Action dated May 27, 2014, issued in corresponding Japanese Patent Application No. 2012-050818 (3 pages).

Japanese Office Action dated Oct. 8, 2013, issued in Japanese Application No. 2012-050818.

Office Action dated Apr. 14, 2015, issued in corresponding Chinese Patent Application No. 201310067003.2, with English translation (9 pages).

* cited by examiner

HIGH-VOLTAGE EQUIPMENT COOLING SYSTEM FOR ELECTRIC VEHICLE AND HIGH-VOLTAGE EQUIPMENT COOLING METHOD FOR ELECTRIC VEHICLE

CROSS REFERENCE TO RELATED APPLICATION

The present application claims benefit of the filing date of Japanese Patent Application No. 2012-050818 filed on Mar. 7, 2012 which is incorporated herein by reference.

TECHNICAL FIELD

The present invention relates to a high-voltage equipment cooling system for electric vehicle and a high-voltage equipment cooling method for electric vehicle, in order to cool the high-voltage equipment provided in an electric vehicle.

BACKGROUND OF INVENTION

A high-voltage equipment such as a battery for driving a motor is conventionally provided in an electric vehicle that is driven by a rotational power generated by a motor, and a hybrid vehicle that is driven by a combination of a rotational power generated by an internal combustion engine (a gasoline engine or a diesel engine, for example) and a rotational power generated by a motor.

By the way, a battery is accompanied by heat at the time of charging and discharging, and the increasing temperature renders the battery performance lower and the battery life shorter. Therefore, a cooling system is required for cooling high-voltage equipments such as a battery. In this regard, a vehicle battery cooling device is disclosed in Patent Literature 1 to cool a battery mounted on a vehicle using the air in the vehicle compartment.

Further, the amount of combustion heat of the high-voltage equipment is increasing recently, and it may be difficult to cool the high-voltage equipment only with the air in the vehicle compartment. In this regard, a battery temperature control device is disclosed in Patent Literature 2 to cool the battery by directly leading the air cooled by an air conditioning unit.

SUMMARY OF INVENTION

Description of Related Art

Meanwhile, the vehicle battery cooling device disclosed in Patent Literature 1 is provided with a quarter vent duct on the downstream side of the exhaust port of the exhaust duct for discharging the air after cooling the battery, in order to discharge some of the air discharged from the exhaust port of the exhaust duct out of the vehicle compartment when the air pressure in the vehicle compartment becomes higher than the air pressure outside the vehicle compartment, while the remainder is returned into the vehicle compartment.

Therefore, when the quarter vent duct is in closed status, the air after cooling the battery is discharged into the vehicle compartment.

In this way, as the exhaust temperature is increased by the exhaust heat of the high-voltage equipment, the temperature in the vehicle compartment also increases and there is a possibility that the temperature in the vehicle compartment becomes a value not intended by the driver, when supplying the high-voltage equipment with the air cooled by an air-conditioning (Heating, Ventilation, and Air-Conditioning or HVAC) unit as described in Patent Literature 2, thereby degrading the performance of the air-conditioning unit.

Then, the present invention is intended to provide a high-voltage equipment cooling system for electric vehicle and a high-voltage equipment cooling method for electric vehicle to improve the performance of an air-conditioning unit in the vehicle compartment, while cooling the high-voltage equipment.

Means for Solving Problems

As a means for solving the aforementioned problems, the present invention provides a high-voltage equipment cooling system for electric vehicle including a motor that drives the electric vehicle; a high-voltage equipment that is installed in the electric vehicle to supply power to the motor; a blowing means for high-voltage equipment that supplies cooling air to the high-voltage equipment; an outlet valve that opens and closes by the pressure difference between inside and outside of the vehicle compartment and discharges cooling air heat-exchanged with the high-voltage equipment out of the vehicle compartment; an air conditioning means that includes: an ambient air flow channel that extends from an ambient air inlet for inletting air outside the vehicle compartment to a first discharge port for discharging air into the vehicle compartment; a cabin air flow channel that extends from a cabin air inlet for air conditioning for inletting air in the vehicle to a second discharge port for discharging air into the vehicle compartment; an ambient air fan that is arranged in the ambient air flow channel; a cabin air fan that is arranged in the cabin air flow channel; an air cooling means that cools air flowing through the ambient air flow channel and the cabin air flow channel; and an air heating means that heats air flowing through the ambient air flow channel and the cabin air flow channel; a channel that branches from a portion on the ambient air flow channel, at a downstream side of the air cooling means but at an upstream side of the air heating means, to an inlet of the blowing means for high-voltage equipment; a cabin air inlet for cooling that is arranged at an upstream side of the blowing means for high-voltage equipment and inlets air from the vehicle compartment; and an air inlet mode selection means that is arranged at the portion where the channel branches, and switches a channel for air, which is sucked into the inlet of the blowing means for high-voltage equipment, between the ambient air inlet and the cabin air inlet for cooling, wherein the air outside the vehicle compartment is introduced by the air inlet mode selection means when supplying air cooled by the air cooling means to the high-voltage equipment from the blowing means for high-voltage equipment.

According to the high-voltage equipment cooling system for electric vehicle, the outlet valve opens by inletting the outside air using the air inlet mode selection means. As the high-temperature cooling air discharged from the high-voltage equipment is exhausted out of the vehicle compartment through the outlet valve accordingly, the exhaust heat from the high-voltage equipment is suppressed from being supplied into the vehicle compartment, thereby improving the performance of the air-conditioning unit.

In addition, it is preferable that the air conditioning means in the high-voltage equipment cooling system for electric vehicle regulates an air-flow rate by the ambient air fan so as to be greater than or equal to an air-flow rate by the blowing means for high-voltage equipment, when supplying the air cooled by the air cooling means to the high-voltage equipment from the blowing means for high-voltage equipment.

According to the above high-voltage equipment cooling system for electric vehicle, the air in the vehicle compartment is suppressed from flowing out of the first discharge port, by regulating the air-flow rate by the ambient air fan so as to be greater than or equal to the air-flow rate by the blowing means for high-voltage equipment. Thus air backflow from the first discharge port is prevented, thereby avoiding the user from feeling discomfort.

It is also preferable that the high-voltage equipment cooling system for electric vehicle further includes an ambient temperature detecting means for detecting the temperature of the air outside the vehicle compartment, and the air cooling by the air cooling means is stopped when the temperature detected by the ambient temperature detecting means is equal to or lower than the predetermined temperature.

According to the above high-voltage equipment cooling system for electric vehicle, since the air cooling means is stopped when the temperature of the air outside the vehicle compartment is sufficiently low, it is possible to reduce operation energy for the air cooling means, thereby improving operation efficiency of the entire system.

In addition, it is preferable that the high-voltage equipment cooling system for electric vehicle further includes a high-voltage equipment temperature detection means for detecting the temperature of the high-voltage equipment, and the air in the vehicle compartment is inlet by the air inlet mode selection means when the temperature detected by the high-voltage equipment temperature detection means is equal to or lower than the predetermined temperature.

According to the above high-voltage equipment cooling system for electric vehicle, it is possible to suppress the high-voltage equipment for being cooled more than necessary.

Moreover, it is preferable that the high-voltage equipment cooling system for electric vehicle further includes a cabin air temperature detection means for detecting the temperature of the air in the vehicle compartment, and the air in the vehicle compartment is inlet by the air inlet mode selection means when the temperature detected by the cabin air temperature detection means is equal to or lower than the predetermined temperature.

According to the above high-voltage equipment cooling system for electric vehicle, it is possible to increase the temperature of the air in the vehicle compartment by supplying the exhaust heat from the high-voltage equipment into the vehicle compartment when the temperature of the air in the vehicle compartment is lower than the predetermined temperature.

Furthermore, it is preferable that the first discharge port in the high-voltage equipment cooling system for electric vehicle is formed so that the air is blown out toward other than the top of the occupant.

According to the above high-voltage equipment cooling system for electric vehicle, it is possible to prevent the blown-out air from hitting the sensitive site (such as the face of the occupant), thereby avoiding the occupant from feeling discomfort.

Additionally, as a means for solving the aforementioned problems, the present invention provides a cooling method for a high-voltage equipment installed in an electric vehicle to supply power to a motor that drives the electric vehicle, further including a blowing means for high-voltage equipment that supplies cooling air to the high-voltage equipment; an outlet valve that opens and closes by the pressure difference between inside and outside of the vehicle compartment and discharges cooling air heat-exchanged with the high-voltage equipment out of the vehicle compartment; an air conditioning means that includes an ambient air flow channel that extends from an ambient air inlet for inletting air outside the vehicle compartment to a first discharge port for discharging air into the vehicle compartment, a cabin air flow channel that extends from a cabin air inlet for air conditioning for inletting air in the vehicle compartment to a second discharge port for discharging air into the vehicle compartment, an ambient air fan that is arranged in the ambient air flow channel, a cabin air fan that is arranged in the cabin air flow channel, an air cooling means that cools air flowing through the ambient air flow channel and the cabin air flow channel and an air heating means that heats air flowing through the ambient air flow channel and the cabin air flow channel; a channel that branches from a portion on the ambient air flow channel, at a downstream side of the air cooling means but at an upstream side of the air heating means, to an inlet of the blowing means for high-voltage equipment; a cabin air inlet for cooling that is arranged at an upstream side of the blowing means for high-voltage equipment and inlets air from the vehicle compartment; and an air inlet mode selection means that is arranged at the portion where the channel branches, and switches a channel for air, which is sucked into the inlet of the blowing means for high-voltage equipment, between the ambient air inlet and the cabin air inlet for cooling, wherein the air outside the vehicle compartment is introduced by the air inlet mode selection means when supplying cooling air cooled by the air cooling means to the high-voltage equipment from the blowing means for high-voltage equipment.

According to the above high-voltage equipment cooling method for electric vehicle, the outlet valve opens by inletting the ambient air using the air inlet mode selection means. As the high-temperature cooling air discharged from the high-voltage equipment is exhausted out of the vehicle compartment through the outlet valve accordingly, the exhaust heat from the high-voltage equipment is suppressed from being supplied into the vehicle compartment, thereby improving the performance of the air-conditioning unit.

Effects of Invention

According to the present invention, a high-voltage equipment cooling system for electric vehicle and a high-voltage equipment cooling method for electric vehicle are provided to improve the performance of an air-conditioning unit in the vehicle compartment, while cooling the high-voltage equipment.

EMBODIMENT OF INVENTION

Hereinafter, embodiments for implementing the present invention are described in detail with reference to the accompanying drawings. In each figure, common parts are denoted with the same reference numerals and the duplicate description will be omitted.

In addition, although the following description for an electric vehicle that mounts the high-voltage equipment cooling system for electric vehicle according to the present embodiment is assumed to be a hybrid vehicle powered by a combination of a rotational power generated by an internal combustion engine and a rotational power generated by a motor, it is not limited to this and it may be an electric vehicle powered by a rotational power generated by a motor.

First Embodiment

Figure 1:
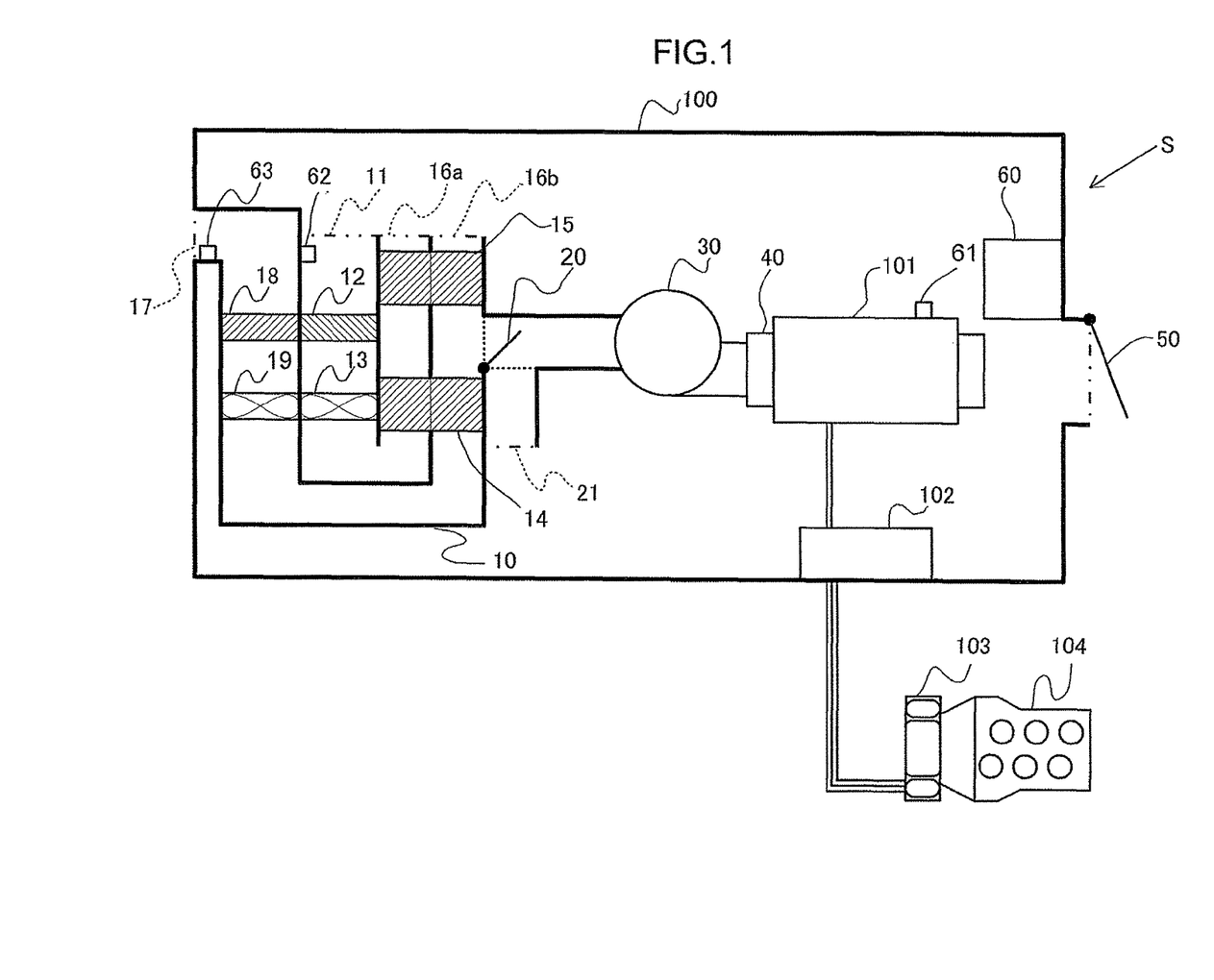
FIG. 1 is a block diagram of a high-voltage equipment cooling system for electric vehicle according to a first embodiment.

FIG. 1 is a block diagram of a high-voltage equipment cooling system for electric vehicle S according to a first embodiment Here, prior to the description of a high-voltage equipment cooling system for electric vehicle S, a drive system of an electric vehicle having a high-voltage equipment (IPU 101 to be described later), which is to be cooled by the high-voltage equipment cooling system for electric vehicle S, will be described. The drive system of an electric vehicle includes an IPU 101, a PDU 102, a motor 103, and an engine 104.

The IPU (Intelligent Power Unit) 101 is a high-voltage equipment that requires cooling, and configured with a battery, a DC/DC converter (down converter), and so forth.

It should be noted that a battery generates heat at the time of charging and discharging, and the performance decreases with the increasing temperature of the battery and the life is shortened as well. In addition, a DC/DC converter (down converter) is intended to step down a high voltage of the battery to a predetermined voltage (12V, for example), and generates heat during the step-down. Incidentally, a power stepped down to the predetermined voltage (12V, for example) by the DC/DC converter is to be supplied to various devices (a cabin air fan 13, an ambient air fan 19, a cooling fan 30, an ECU 60 and so forth to be described later).

Thus, the IPU 101 (high-voltage equipment) is placed in a vehicle compartment space 100 (air-conditioned space) of the electric vehicle, which space is air-conditioned by a HVAC 10 to be described later, and cooled by a high-voltage equipment cooling system for electric vehicle S to be described later.

The PDU (Power Drive Unit) 102 is composed of a AC/DC converter or the like, for example, to convert a direct current supplied from the IPU 101 to a three-phase alternating current for being supplied to the motor 103 during discharge of the battery in the IPU 101 (during power running of the motor 103). On the other hand, it is possible to convert a three-phase AC current supplied from the motor 103 to a direct current for being supplied to the battery in the IPU 101 during charging of the battery in the IPU 101 (during regeneration of the motor 103).

It should be noted that it is desirable to be disposed in the vehicle compartment space 100 (air-conditioned space) of the electric vehicle as shown in FIG. 1, which space is air-conditioner by the HVAC 10 to be described later, as heat is generated by the PDU 102 when converting a direct current to a three-phase alternating current and vice versa.

Further, the IPU 101 and the PDU 102 are shown as separate units in FIG. 1, but the IPU 101 and the PDU 102 may be integrated into one unit. Also the PDU 102 may be cooled by the high-voltage equipment cooling system for electric vehicle S to be described later, in conjunction with the IPU 101.

The motor 103, disposed outside the vehicle compartment (outside the vehicle compartment space 100), may function as a motor to generate rotational power for rotating the drive axle (not shown) by the power supplied from the battery in the IPU 101, as well as a generator to charge the battery in the IPU 101 by power regeneration.

The engine 104, disposed outside the vehicle compartment (outside the vehicle compartment space 100), is intended to generate rotational power for rotating the drive axle (not shown).

Thus, it is possible for the electric vehicle to do power running by transmitting the rotational power generated by the motor 103 and/or the engine 104 to the wheel (not shown) via the drive axle (not shown). In addition, it is possible to charge the battery in the IPU 101 by the regenerative power of the motor 103 as a generator.

Next, the high-voltage equipment cooling system for electric vehicle S according to the first embodiment will be described. The high-voltage equipment cooling system for electric vehicle S is provided with a HVAC 10, an air inlet mode selection valve 20, a cooling fan 30, a cooling air channel 40, an outlet valve 50, and an ECU 60.

An air conditioner (hereinafter referred to as HVAC which stands for Heating, Ventilation, and Air Conditioning) 10 is an air-conditioner having a two-layer air-inlet structure. That is, the HVAC 10 is provided with a cabin air flow channel that flows through in the order of an air-inlet-port-for-air-conditioning 11, a cabin air filter 12, a cabin air fan 13, an evaporator 14, a heater 15 and a cabin air discharge port 16a, and an ambient air flow channel that flows through in the order of an ambient air inlet 17, an ambient air filter 18, an ambient air fan 19, an evaporator 14, a heater 15 and an ambient air discharge port 16b. And ducts and the like (pipes) are suitably disposed so that a cabin air flow channel or the like is formed.

The air-inlet-port-for-air-conditioning 11 is an inlet port for inletting air (cabin air) from the vehicle compartment space 100. The cabin air filter 12 is intended to remove foreign matter (such as dirt and dust) in the air that is sucked from the air-inlet-port-for-air-conditioning 11.

The cabin air fan 13 is designed to suck cabin air from the air-inlet-port-for-air-conditioning 11, by generating a negative pressure.

Also the ambient air inlet 17 is an inlet port for inletting air (ambient air) from outside the vehicle compartment (outside the vehicle compartment space 100). The ambient air filter 18 is intended to remove foreign matter (such as dirt and dust) in the air that is sucked from the ambient air inlet 17.

The ambient air fan 19 is designed to suck ambient air from the ambient air inlet 17, by generating a negative pressure.

The evaporator 14 is a device for cooling the inlet air, and the heater 15 is a device for heating the inlet air.

When cooling the air (that is, cooling the vehicle compartment space 100), it is possible to cool the air by operating the evaporator 14. In addition, when heating the air (that is, heating the vehicle compartment space 100), it is possible to heat the air by operating the heater 15. Further, when dehumidifying the air, it is possible to dehumidify the air by the evaporator 14 cooling the sucked air for condensing moisture therein and the heater 15 heating the cooled air.

The evaporator 14 is connected to the heat pump refrigerant circuit (not shown) and adapted to cool the air by performing heat exchange between refrigerant and the air.

The heat pump refrigerant circuit (not shown) is provided with a compressor, a condenser, a pressure reducing valve and an evaporator (evaporator 14). High-temperature and high-pressure refrigerant compressed by the compressor becomes mid-temperature and mid-pressure refrigerant by heat exchange with the ambient air in the condenser. Then, the refrigerant is partially liquefied and becomes low-temperature and low-pressure gas-liquid mixing refrigerant by the pressure reducing valve reducing pressure.

Then, the air is cooled by the evaporator (evaporator 14) performing heat exchange between the low-temperature and low-pressure gas-liquid mixing refrigerant and the air. It should be noted that the vaporized refrigerant by absorbing heat from the air is introduced into the compressor again.

The heater 15 is adapted to heat the air, for example, by heat exchange between the cooling water of the engine 104 and the air.

Thus, by operating the cabin air fan 13, the air in the vehicle compartment space 100 (cabin air) sucked from the air-inlet-port-for-air-conditioning 11 is air-conditioned by the evaporator 14 and/or the heater 15, discharged from the cabin air discharge port 16a and returned to the vehicle compartment space 100.

Also, by operating the ambient air fan 19, the air outside the vehicle compartment (outside the vehicle compartment space 100) (ambient air) sucked from the ambient air inlet 17 is air-conditioned by the evaporator 14 and/or the heater 15, discharged from the ambient air discharge port 16b and returned to the vehicle compartment space 100.

It should be noted that the rotational speed of the cabin air fan 13 and the ambient air fan 19 (that is, air-flow-rate of the cabin air fan 13 and the ambient air fan 19), and the operation of the evaporator 14 and the heater 15 is adapted to be controlled by the ECU 60.

Further, a channel that branches to the inlet of cooling fan 30 is formed from downstream of the evaporator 14 as well as upstream of the heater 15 in the ambient air flow channel.

The air inlet mode selection valve 20 is adapted to be able to switch the channel for the air sucked into the cooling fan 30 to become either the ambient air inleted from the ambient air inlet 17 and passing through the evaporator 14 of the ambient air flow channel in the HAVAC 10, or the cabin air in the vehicle compartment space 100 inleted from an air-inlet-port-for-cooling 21.

It should be noted that the air inlet mode selection valve 20 is adapted to be controlled by the ECU 60.

The cooling fan 30 is adapted to discharge the sucked air to the cooling air channel 40 as cooling air for cooling the IPU 101 (high-voltage equipment).

It should be noted that the rotational speed of the cooling fan 30 (that is, the air-flow rate of the cooling fan 30) is adapted to be controlled by the ECU 60.

The cooling air channel 40 is a channel in which cooling air blown by the cooling fan 30 flows through, and adapted to be able to cool the IPU 101 (high-voltage equipment) by the cooling air flowing through the cooling air channel 40.

It should be noted that it is preferable for the outlet of the cooling air channel 40 to be disposed so as to discharge the air toward the outlet valve 50.

The outlet valve 50 is a normally-closed opening and closing valve, which is formed with a spring biasing a valving element to the closing direction, and opened and closed by the pressure difference between the pressure (atmospheric pressure) in the vehicle compartment space 100 and the pressure (atmospheric pressure) outside the vehicle compartment. Specifically, when the pressure in the vehicle compartment space 100 is higher than the pressure outside the vehicle compartment, the outlet valve 50 opens the valve for rendering the vehicle compartment space 100 and outside the vehicle compartment to communicate each other, and discharges the air in the vehicle compartment space 100 outside of the vehicle compartment by the pressure difference. In addition, when the pressure in the vehicle compartment space 100 is equal to or lower than the pressure outside the vehicle compartment, the outlet valve 50 closes the valve for blocking the communication between the vehicle compartment space 100 and outside the vehicle compartment.

The ECU (Electronic Control Unit) 60 is able to control the rotational speed (air-flow rate) of the cabin air fan 13, the ambient air fan 19 and the cooling fan 30, the operation of the evaporator 14 and the heater 15, and the switching of the air inlet mode selection valve 20, based on the detected temperature of various thermistors (61, 62, 63). It should be noted that the thermistor 61 is adapted to detect the temperature of the IPU 101 (battery temperature, for example), the thermistor 62 to detect the temperature of the inlet cabin air and the thermistor 63 to detect the temperature of the inlet ambient air.

Operation of High-Voltage Equipment Cooling System for Electric Vehicle S According to First Embodiment Next, the operation of the high-voltage equipment cooling system for electric vehicle S will be described with reference to FIG. 2.

Figure 2:
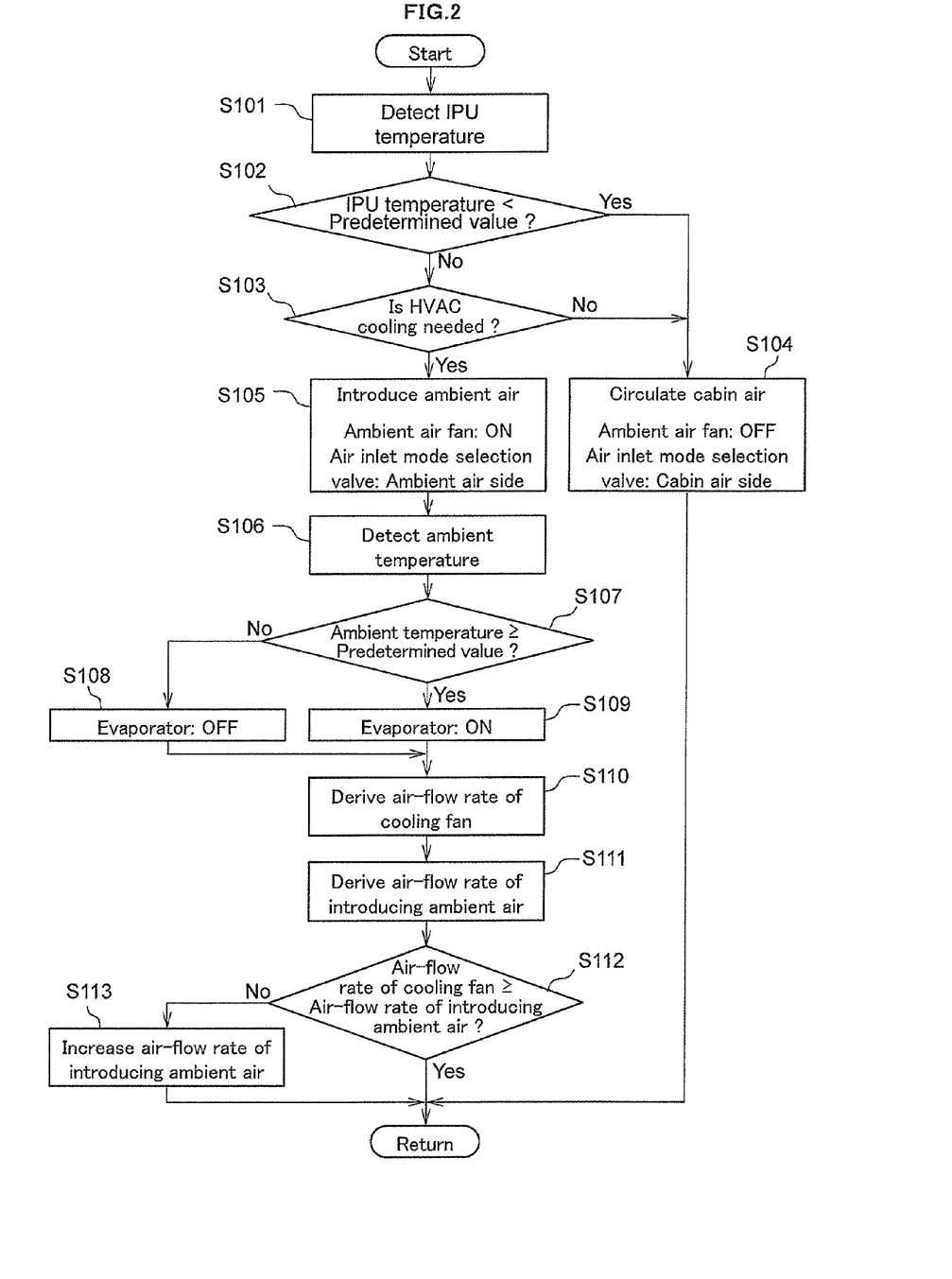
FIG. 2 is a flowchart to describe the operation of a high-voltage equipment cooling system for electric vehicle according to a first embodiment.

FIG. 2 is a flowchart to describe the operation of high-voltage equipment cooling system for electric vehicle S according to the first embodiment.

At step S101, the ECU 60 obtains the temperature of the IPU (battery, for example) from the thermistor 61 which detects the temperature of the IPU 101.

At step S102, the ECU 60 determines whether or not the IPU temperature obtained at step S101 is lower than a predetermined value. Here, the predetermined value at step S102 is a threshold value to determine whether or not battery warm-up is needed. It should be noted that the battery performance is degraded at low temperature and the battery life becomes shorter when used at low temperature for a long time as well.

When the IPU temperature is lower than a predetermined value (Yes at S102), processing of the ECU 60 proceeds to step S104. On the other hand, when the IPU temperature is not lower than a predetermined value (No at S102), processing of the ECU 60 proceeds to step S103.

At step S103, the ECU 60 determines whether or not cooling the IPU 101 by the HVAC 10 is needed. Here, whether or not cooling the IPU 101 by the HVAC 10 is needed is determined by whether or not the performance of the air-conditioning unit is degraded when circulating the cooling air, which absorbs heat from the IPU 101, in the vehicle compartment space 100.

For example, upon obtaining the temperature in the vehicle compartment from the thermistor 62 that detects the temperature therein, it is determined that cooling the IPU 101 by the HAVAC 10 is not required if the temperature in the vehicle compartment is lower than the predetermined temperature. Here, the predetermined temperature is a target temperature of air-conditioning in the vehicle compartment space 100, for example.

Also, it may be determined that cooling the IPU 101 by the HAVAC 10 is required if the high-heat generation of the IPU 101 is expected in such a case when driving mode of the electric vehicle is sport mode.

When cooling the IPU 101 by the HAVAC 10 is required (Yes at S103), processing of the ECU 60 proceeds to step S105. On the other hand, when cooling the IPU 101 by the HAVAC 10 is not required (No at S103), processing of the ECU 60 proceeds to step S104.

At step S104, the ECU 60 cools the IPU 101 by cabin air circulation of the high-voltage equipment cooling system for electric vehicle S.

Specifically, the ECU 60 stops the ambient air fan 19 and controls the air inlet mode selection valve 20 for switching the air flow channel so that the air sucked by the cooling fan 30 is the inlet air from the air-inlet-port-for-cooling 21 (cabin air). Then, the ECU 60 runs the cooling fan 30. Note that it is desirable for the rotational speed of the cooling fan 30 (air-flow rate) to be controlled based on the IPU temperature obtained from the thermistor 61, for example, rendering the rotational speed of the cooling fan 30 higher as the IPU temperature increases. Then, processing of the ECU 60 returns and repeats the process in FIG. 2.

On the other hand, at step S105, the ECU 60 cools the IPU 101 by introducing ambient air to the high-voltage equipment cooling system for electric vehicle S.

Specifically, the ECU 60 runs the ambient air fan 19 and controls the air inlet mode selection valve 20 for switching the air flow channel so that the air sucked by the cooling fan 30 is the inlet air from the ambient air inlet 17 (ambient air). Then, the ECU 60 runs the cooling fan 30. Note that it is desirable for the rotational speed of the cooling fan 30 (air-flow rate) to be controlled based on the IPU temperature obtained from the thermistor 61.

At step S106, the ECU 60 obtains the ambient temperature from the thermistor 63 that detects the ambient temperature.

At step S107, the ECU 60 determines whether or not the ambient temperature obtained at step S106 is higher than the predetermined value. Here, the predetermined value at step S107 is a threshold value for determining whether or not the ambient air sucked from the ambient air inlet 17 has a temperature used as cooling air for the IPU 101.

When the ambient temperature is equal to or higher than the predetermined value (Yes at S107), processing by the ECU 60 proceeds to step S109. On the other hand, when the ambient temperature is lower than the predetermined value (No at S107), processing by the ECU 60 proceeds to step S108.

At step S108, the ECU 60 stops supplying the refrigerant to the evaporator 14. Then, processing of the ECU 60 proceeds to step S110.

At step S109, the ECU 60 operates the evaporator 14. Thus, the ambient air is cooled by the evaporator 14. Then, processing of the ECU 60 proceeds to step S110.

At step S110, the ECU 60 derives the air-flow rate of cooling fan which is the air-flow rate of the cooling fan 30. It should be noted that the air-flow rate of the cooling fan 30 is calculated based on the rotational speed of the cooling fan 30. Incidentally, the rotational speed of the cooling fan 30 is controlled by the ECU 60 based on the IPU temperature obtained from the thermistor 61, for example.

At step S111, the ECU 60 derives the air-flow rate of introducing ambient air. It should be noted that the air-flow rate of introducing ambient air is calculated based on the rotational speed of the ambient air fan 19.

At step S112, the ECU 60 determines whether or not the air-flow rate of cooling fan derived at step S110 is equal to or greater than the air-flow rate of introducing ambient air derived at step S111.

When the air-flow rate of cooling fan is equal to or greater than the air-flow rate of introducing ambient air (Yes at S112), processing of the ECU 60 returns and repeats the process in FIG. 2. On the other hand, when the air-flow rate of cooling fan is smaller than the air-flow rate of introducing ambient air (No at S112), processing of the ECU 60 proceeds to step S113.

At step S113, the ECU 60 increases the air-flow rate of introducing ambient air so that the air-flow rate of introducing ambient air becomes greater than the air-flow rate of cooling fan, by increasing the rotational speed of the ambient air fan 19. Then, processing of the ECU 60 returns and repeats the process in FIG. 2.

Summary

Thus, upon introducing the ambient air by running the ambient air fan 19 (see S105), the outlet valve 50 opens since the pressure in the vehicle compartment space 100 becomes higher than the outside pressure. Accordingly, as the high-temperature cooling air discharged from the cooling air channel 40 is exhausted outside the vehicle compartment through the outlet valve 50, it is possible to suppress the exhaust heat from the IPU 101 (high-voltage equipment) being supplied to the vehicle compartment space 100 (air-conditioned space) and improve the performance of the air-conditioning unit, as well as to save energy by reducing the cooling load for the vehicle compartment space 100 (air-conditioned space).

In addition, sucking cabin air from the ambient air discharge port 16b is suppressed by controlling the air-flow rate of introducing ambient air being greater than the air-flow rate of cooling fan (see S110 to S113). Thus, it is possible to prevent backflow of sucking from the ambient air discharge port 16b, thereby avoiding the user from feeling discomfort.

Further, when the ambient temperature is low enough, supplying the refrigerant to the evaporator 14 is stopped, that is, the compressor of the refrigerant circuit is stopped (No at S107, see S108). Thus, as the ambient air is directly used as the cooling air without being cooled in the evaporator 14 when the ambient temperature is low enough, it is possible to reduce the operation energy of the compressor constituting the heat pump refrigerant circuit together with the evaporator 14, thereby improving the operation efficiency of the entire system.

Furthermore, the cabin air is adapted to circulate when the IPU temperature (battery temperature) is less than the predetermined value (Yes at S102, see S104). This enables to suppress the temperature of the IPU 101, particularly the temperature of the battery, becoming too low, thereby suppressing the deterioration of the battery, as well as the performance deterioration thereof.

Moreover, the cabin air is adapted to circulate when the cabin air temperature of the vehicle compartment space 100 is lower than the target temperature of air-conditioning in the vehicle compartment space 100 (No at S103, see S104). Thus, the exhaust heat of the IPU 101 can be incorporated into the vehicle compartment space 100, thereby saving energy by reducing the heating load of the HVAC 10.

Note that the HAVAC 10 according to the embodiment is provided with the cabin air discharge port 16a and the ambient air discharge port 16*b* as discharge ports for the air-conditioned air to be blown into the vehicle compartment space 100, and it is desirable that the cabin air discharge port 16*a* is, for example, an outlet-for-upper-part-of-occupant (face-side outlet) to be laid out on the instrument panel (dashboard) and to blow air toward the upper part of the occupant (such as face) and the ambient air discharge port 16*b*, an outlet branching to the inlet of the cooling fan 30, is, for example, an outlet-for-lower-part-of-occupant (foot-side outlet) to blow air to the vehicle compartment space 100 without pointing to the upper part of the occupant.

When cooling the IPU 101 by introducing ambient air, air is sometimes blown out from the ambient air discharge port 16*b* even after stopping the air-conditioning for the vehicle compartment space 100, but it is possible with the aforementioned configuration to prevent the blown-out air from the ambient air discharge port 16*b*, if any, from hitting sensitive site (such as the face of the occupant), thereby avoiding the occupant from feeling discomfort.

Second Embodiment

Next, a high-voltage equipment cooling system for electric vehicle SA according to a second embodiment will be described with reference to FIGS. 3 and 4.

Figure 3:
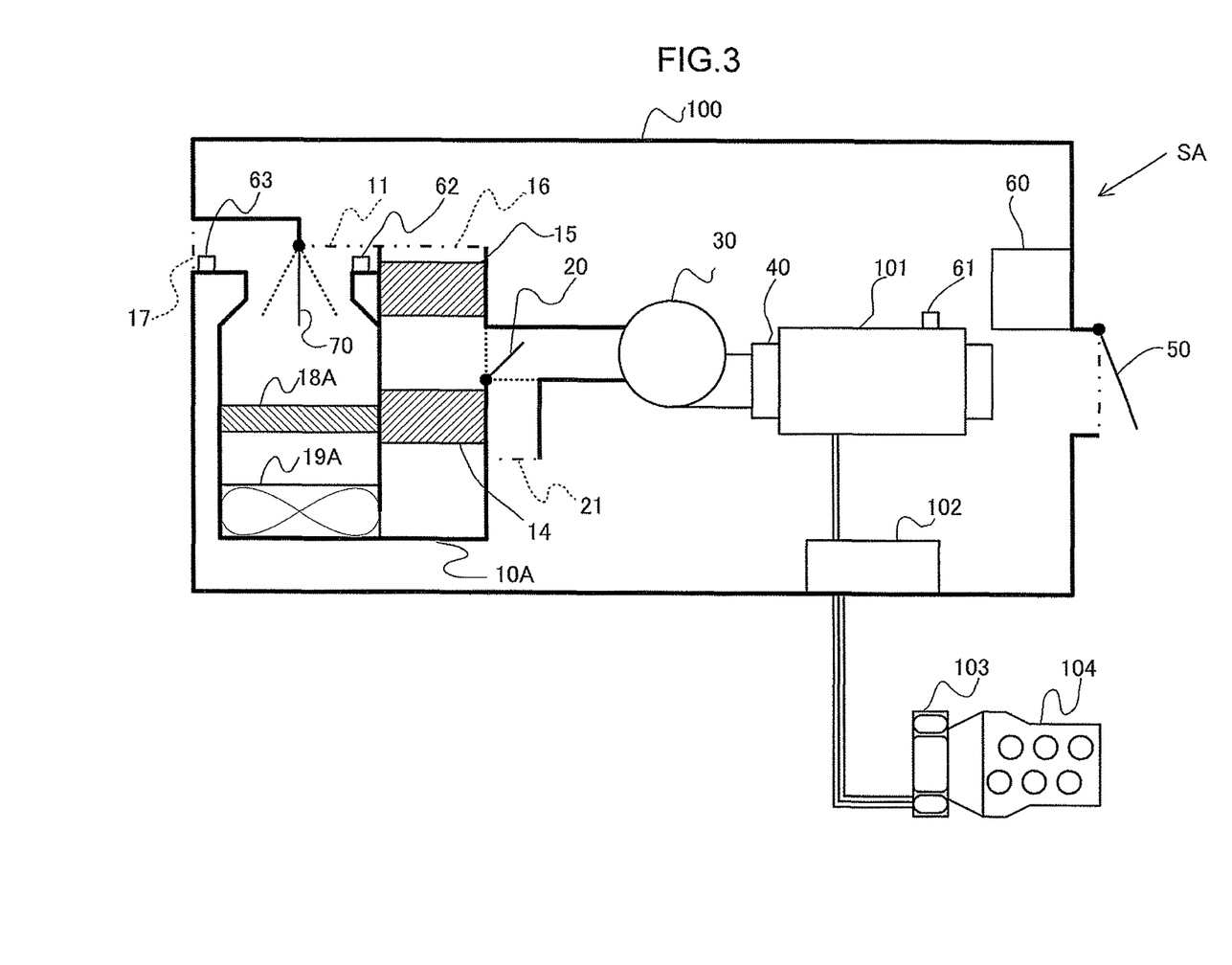
FIG. 3 is a block diagram of a high-voltage equipment cooling system for electric vehicle according to a second embodiment.

FIG. 3 is a block diagram of the high-voltage equipment cooling system for electric vehicle SA according to the second embodiment. The high-voltage equipment cooling system for electric vehicle SA (See FIG. 3) according to the second embodiment is different from the high-voltage equipment cooling system for electric vehicle S (See FIG. 1) according to the first embodiment in the configuration of a HVAC 10A. Other configurations are the same as the first embodiment and those descriptions will be omitted.

The HVAC 10A is an air conditioner to air-condition by mixing the cabin air and the ambient air, and includes the air-inlet-port-for-air-conditioning 11, the ambient air inlet 17, a filter 18A, a fan 19A, the evaporator 14, the heater 15, a discharge port 16 and an air inlet adjustment valve 70.

The air-inlet-port-for-air-conditioning 11 is an inlet for absorbing air (cabin air) from the vehicle compartment space 100. In addition, the ambient air inlet port 17 is an inlet port for absorbing air (ambient air) from outside the cabin (outside the vehicle compartment space 100).

The air inlet adjustment valve 70 is a valve (damper) to adjust the ratio of the cabin air that is sucked from the air-inlet-port-for-air-conditioning 11 and the ambient air that is sucked from the ambient air inlet port 17 by turning platy switch, and the ratio is to be controlled by the ECU 60.

The filter 18A is intended to remove foreign matter (such as dirt and dust) in the air that is sucked from the air-inlet-port-for-air-conditioning 11 and/or the ambient air inlet port 17.

The fan 19A is adapted to suck air from the air-inlet-port-for-air-conditioning 11 and/or the ambient air inlet port 17, by generating a negative pressure.

Thus, by running the fan 19A, the air in the vehicle compartment space 100 sucked from the air-inlet-port-for-air-conditioning 11 (cabin air) and the air outside the cabin (outside the vehicle compartment space 100) sucked from the ambient air inlet port 17 are air-conditioned by the evaporator 14 and/or the heater 15, then discharged from the discharge port 16 into the vehicle compartment space 100.

It should be noted that the rotational speed of the fan 19A (air-flow rate) and the operation of the evaporator 14 and the heater 15 are adapted to be controlled by the ECU 60.

Operation of High-Voltage Equipment Cooling System for Electric Vehicle SA According to Second Embodiment Next, the operation of the high-voltage equipment cooling system for electric vehicle SA will be described with reference to FIG. 4.

Figure 4:
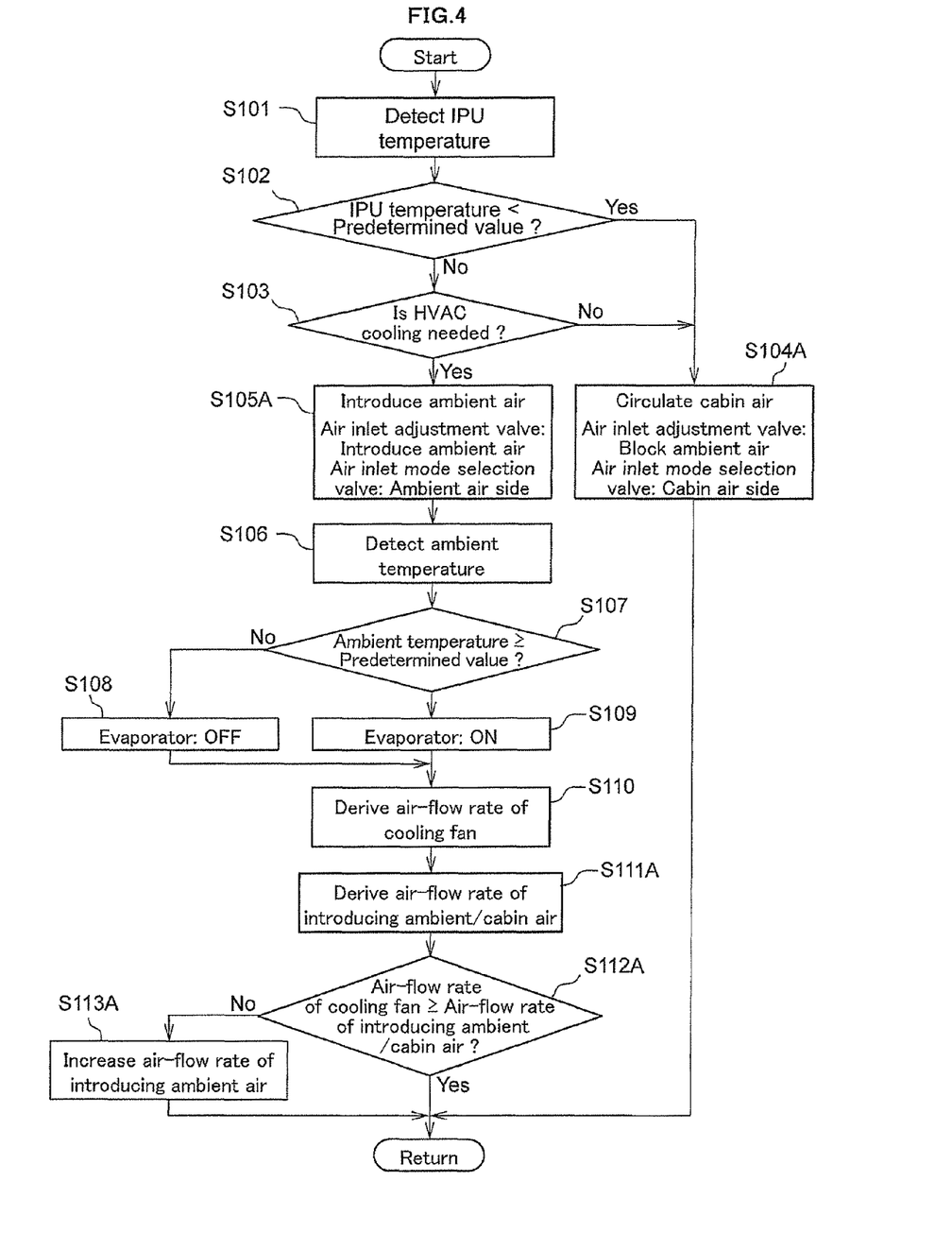
FIG. 4 is a flowchart to describe the operation of a high-voltage equipment cooling system for electric vehicle according to a second embodiment.

FIG. 4 is a flowchart for explaining the operation of the high-voltage equipment cooling system for electric vehicle SA according to the second embodiment.

Processing of the high-voltage equipment cooling system for electric vehicle S according to the first embodiment (see FIG. 2) and processing of the high-voltage equipment cooling system for electric vehicle SA according to the second embodiment (see FIG. 4) are different on the point that steps S104, S105, S111 to S113 of the first embodiment are replaced by steps S104A, S105A, S111A to S113A of the second embodiment. Other processes are the same as the first embodiment and their descriptions will be omitted.

At step S104A, the ECU 60 cools the IPU 101 by cabin air circulation of the high-voltage equipment cooling system for electric vehicle SA.

Specifically, the ECU 60 controls the air inlet adjustment valve 70 for switching the air flow channel so that the air sucked from the ambient air inlet port 17 is blocked. In addition, the ECU 60 controls the air inlet mode selection valve 20 for switching the air flow channel so that the air sucked by the cooling fan 30 is the air taken from the air-inlet-port-for-cooling 21 (cabin air). Then, the ECU 60 runs the cooling fan 30. And, processing of the ECU 60 returns and repeats the process in FIG. 4.

At step S105A, the ECU 60 cools the IPU 101 by introducing ambient air to the high-voltage equipment cooling system for electric vehicle SA.

Specifically, the ECU 60 controls the air inlet adjustment valve 70 for switching the air flow channel so that the ambient air is introduced from the ambient air inlet port 17. In addition, the ECU 60 runs the fan 19A and controls the air inlet mode selection valve 20 for switching the air flow channel so that the air sucked by the cooling fan 30 is the air discharged from the fan 19A. Then, the ECU 60 runs the cooling fan 30. Note that, when introducing ambient air, it is necessary to adjust the air inlet adjustment valve 70 so that ambient air can be introduced, but not necessary to adjust the air inlet adjustment valve 70 for switching the air flow channel so that the air inlet from the air-inlet-port-for-air-conditioning 11 is blocked.

At step S111A, the ECU 60 derives an air-flow rate of introducing ambient air and cabin air. It should be noted that the air-flow rate of introducing ambient air and cabin air is calculated based on the rotational speed of the fan 19A.

At step S112A, the ECU 60 determines whether or not the air-flow rate of cooling fan derived at step S110 is equal to or greater than the air-flow rate of introducing ambient air and cabin air derived at step S111A.

When the air-flow rate of cooling fan is equal to or greater than the air-flow rate of introducing ambient air and cabin air (Yes at S112A), processing of the ECU 60 returns and repeats the process in FIG. 4. On the other hand, when the air-flow rate of cooling fan is less than the air-flow rate of introducing ambient air and cabin air (No at S112A), processing of the ECU 60 proceeds to step S113A.

At step S113A, the ECU 60 increases the air-flow rate of introducing ambient air so that the air-flow rate of introducing ambient air and cabin air is equal to or greater than the air-flow rate of cooling fan, by increasing the rotational speed of the fan 19A. Then, processing of the ECU 60 returns and repeats the process in FIG. 4.

Summary

Thus, the high-voltage equipment cooling system for electric vehicle S, SA according to the present embodiment may include the air-conditioner of the HVAC 10 having a two-layer air-inlet structure (see FIG. 1) or the air conditioner of the HVAC 10A mixing the ambient air and the cabin air for air-conditioning (see FIG. 3). It is possible for the high-voltage equipment cooling system for electric vehicle SA according to the second embodiment to obtain the same effect as the high-voltage equipment cooling system for electric vehicle S according to the first embodiment.

Modification

It should be noted that the high-voltage equipment cooling system for electric vehicle S, SA according to the present embodiment is not limited to the configuration of the above embodiments, and various modifications are possible to the embodiments within the scope without departing from the spirit of the present invention.

In the present embodiment, it has been described that the cooling fan 30 is disposed upstream of the IPU 101 and the cooling fan 30 blows cooling air to the IPU 101, but it is not limited to this. For example, it may be configured such that the cooling fan 30 is disposed downstream of the IPU 101 and cooling air is supplied to the IPU 101 using a negative pressure generated by rotating the cooling fan 30, and such a structure is intended to be included in the present invention as well.

LEGEND FOR REFERENCE NUMERALS 10, 10A HVAC (Cooling means)
11 Air inlet port for air conditioning
12 Cabin air filter
13 Cabin air fan
14 Evaporator (air cooling means)
15 Heater
16 Discharge port (cabin vents)
16a Cabin air discharge port
16b Ambient air discharge port (cabin vents)
17 Ambient air inlet
18 Ambient air filter
18A Filter
19 Ambient air fan (air-conditioning and blowing means)
19A Fan (air-conditioning and blowing means)
20 Air inlet mode selection valve (air inlet mode selection means)
21 Air inlet port for cooling
30 Cooling fan (blowing means for high-voltage equipment)
40 Cooling air channel
50 Outlet valve
60 ECU
61, 62, 63 Thermistor
70 Air inlet adjustment valve
100 Vehicle compartment space (inside the vehicle compartment)
101 IPU (high-voltage equipment)
102 PDU
103 Motor
104 Engine
S, SA High-voltage equipment cooling system for electric vehicle

What is claimed is:

1. A high-voltage equipment cooling system for electric vehicle comprising:
   a motor that drives an electric vehicle;
   a high-voltage equipment that is installed in the electric vehicle to supply power to the motor;
   a blowing means for high-voltage equipment that supplies cooling air to the high-voltage equipment;
   an outlet valve that opens and closes by the pressure difference between inside and outside of a vehicle compartment and discharges cooling air heat-exchanged with the high-voltage equipment out of the vehicle compartment;
   an air conditioning means that includes:
   an ambient air flow channel that extends from an ambient air inlet for inletting air outside the vehicle compartment to a first discharge port for discharging air into the vehicle compartment;
   a cabin air flow channel that extends from a cabin air inlet for air conditioning for inletting air in the vehicle compartment to a second discharge port for discharging air into the vehicle compartment;
   an ambient air fan that is arranged in the ambient air flow channel;
   a cabin air fan that is arranged in the cabin air flow channel;
   an air cooling means that cools air flowing through the ambient air flow channel and the cabin air flow channel; and
   an air heating means that heats air flowing through the ambient air flow channel and the cabin air flow channel,
   wherein the ambient air flow channel and the cabin air flow channel are separate from each other;
   a channel that branches from a portion on the ambient air flow channel, at a downstream side of the air cooling means but at an upstream side of the air heating means, to an inlet of the blowing means for high-voltage equipment;
   a cabin air inlet for cooling that is arranged at an upstream side of the blowing means for high-voltage equipment and inlets air from the vehicle compartment in a way that does not pass through the air conditioning means; and
   an air inlet mode selection means that is arranged at the portion where the channel branches, and switches a channel for air, which is sucked into the inlet of the blowing means for high-voltage equipment, between the ambient air inlet and the cabin air inlet for cooling,
   wherein the air outside the vehicle compartment is introduced by the air inlet mode selection means when supplying air cooled by the air cooling means to the high-voltage equipment from the blowing means for high-voltage equipment.

2. The high-voltage equipment cooling system for electric vehicle according to claim 1,
   wherein the air conditioning means regulates an air-flow rate by the ambient air fan so as to be greater than or equal to an air-flow rate by the blowing means for high-voltage equipment, when supplying the air cooled by the air cooling means to the high-voltage equipment from the blowing means for high-voltage equipment.

3. The high-voltage equipment cooling system for electric vehicle according to claim 2, wherein the first discharge port is formed so that the air is blown out toward other than around a face of the occupant.

4. The high-voltage equipment cooling system for electric vehicle according to claim 2,
wherein the high-voltage equipment cooling system for electric vehicle, when introducing the air outside the vehicle compartment, operates the air-conditioning and blowing means, then switches the air inlet mode selection means for introducing the air outside the vehicle compartment, and thereafter operates the blowing means for high-voltage equipment.

5. The high-voltage equipment cooling system for electric vehicle according to claim 1,
wherein the high-voltage equipment cooling system for electric vehicle further comprises an ambient temperature detecting means for detecting a temperature of the air outside the vehicle compartment, and the air cooling by the air cooling means is stopped when the temperature detected by the ambient temperature detecting means is equal to or lower than the predetermined temperature.

6. The high-voltage equipment cooling system for electric vehicle according to claim 1,
wherein the high-voltage equipment cooling system for electric vehicle further comprises a high-voltage equipment temperature detection means for detecting a temperature of the high-voltage equipment, and the air in the vehicle compartment is inlet by the air inlet mode selection means when the temperature detected by the high-voltage equipment temperature detection means is equal to or lower than the predetermined temperature.

7. The high-voltage equipment cooling system for electric vehicle according to claim 1,
wherein the high-voltage equipment cooling system for electric vehicle further comprises a cabin air temperature detection means for detecting a temperature of the air in the vehicle compartment, and the air in the vehicle compartment is inlet by the air inlet mode selection means when the temperature detected by the cabin air temperature detection means is equal to or lower than the predetermined temperature.

8. The high-voltage equipment cooling system for electric vehicle according to claim 1,
wherein the high-voltage equipment is configured with at least one of a battery, a DC/DC converter and an AC/DC converter.

9. The high-voltage equipment cooling system for electric vehicle according to claim 1,
wherein the high-voltage equipment cooling system for electric vehicle can detect a driving mode of the electric vehicle, the driving mode including a first mode and a second mode, wherein, in the first mode, the high-voltage equipment generates higher heat than in the second mode, and the air outside the vehicle compartment is introduced by the air inlet mode selection means when the driving mode is detected to be the first mode.

* * * * *